United States Patent

Petrovicky et al.

(10) Patent No.: US 9,298,687 B2
(45) Date of Patent: Mar. 29, 2016

(54) AUTOMATIC SPREADSHEET FORMULA OUTPUT VALIDATION

(75) Inventors: Lukas Petrovicky, Most (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 473 days.

(21) Appl. No.: 12/955,156

(22) Filed: Nov. 29, 2010

(65) Prior Publication Data

US 2012/0137204 A1    May 31, 2012

(51) Int. Cl.
*G06F 17/20* (2006.01)
*G06F 17/24* (2006.01)

(52) U.S. Cl.
CPC .................................. *G06F 17/246* (2013.01)

(58) Field of Classification Search
CPC ............................. G06F 17/00; G06F 17/246
USPC ........................................................ 715/219
See application file for complete search history.

(56) References Cited

U.S. PATENT DOCUMENTS

| | | | | |
|---|---|---|---|---|
| 6,360,332 B1 * | 3/2002 | Weinberg et al. | ............... | 714/4.1 |
| 7,299,406 B2 * | 11/2007 | Schnurr | ................ | H04W 24/00 715/212 |
| 7,617,443 B2 * | 11/2009 | Mills | ..................... | G06F 17/246 715/212 |
| 7,624,372 B1 * | 11/2009 | Stewart | ................ | G06F 17/246 717/106 |
| 7,721,270 B2 * | 5/2010 | Ukelson | ........... | G06F 17/30569 717/136 |
| 7,836,425 B2 * | 11/2010 | Rubin | ....................... | G06F 8/30 715/212 |
| 8,140,549 B2 * | 3/2012 | Barinaga | .......... | G06F 17/30905 707/756 |
| 8,396,776 B2 * | 3/2013 | Hayden | ................. | G06Q 10/10 705/35 |
| 8,510,645 B2 * | 8/2013 | Beach | .............. | G06F 17/30286 715/212 |
| 8,566,953 B2 * | 10/2013 | Campbell | ............ | G06F 17/248 709/225 |
| 8,656,270 B2 * | 2/2014 | Rui | ....................... | G06F 17/246 707/661 |
| 8,745,512 B2 * | 6/2014 | Jones | ................... | G06F 3/0481 715/764 |
| 8,812,950 B2 * | 8/2014 | Sikka | ..................... | G06Q 10/10 715/212 |
| 8,904,340 B2 * | 12/2014 | Hicks | ................... | G06F 17/246 715/209 |
| 8,983,894 B2 * | 3/2015 | Cohen | ............... | G06F 17/30864 707/722 |
| 8,983,901 B1 * | 3/2015 | Simon | .................. | G06F 17/246 707/608 |
| 9,053,083 B2 * | 6/2015 | Waldman | ........... | G06F 9/44526 |
| 9,069,436 B1 * | 6/2015 | Fieweger | .......... | G06F 3/0481 |
| 9,129,234 B2 * | 9/2015 | Campbell | ............. | G06Q 10/06 |
| 9,141,393 B2 * | 9/2015 | Kraft | ......................... | G06F 9/44 |
| 9,148,417 B2 * | 9/2015 | Fieweger | ............. | H04L 9/3231 |
| 9,171,099 B2 * | 10/2015 | Prish | ................. | G06F 17/30905 |
| 2003/0226105 A1 * | 12/2003 | Waldau | ........................ | 715/503 |
| 2007/0256004 A1 * | 11/2007 | Payette | ................. | G06F 17/246 |

\* cited by examiner

*Primary Examiner* — Mohammed-Ibrahim Zuberi
(74) *Attorney, Agent, or Firm* — Lowenstein Sandler LLP

(57) ABSTRACT

A spreadsheet validation method may provide a validation input value to an input field of a computer spreadsheet application and identify a calculated result from an output field of the computer spreadsheet application. The result is calculated based on a formula associated with the output field and the formula uses the validation input value as an input. Further, the calculated result may be compared to an expected validation output value.

20 Claims, 5 Drawing Sheets

AUTOMATIC SPREADSHEET FORMULA OUTPUT VALIDATION

TECHNICAL FIELD

This disclosure relates to the field of data processing and, in particular, to automatic spreadsheet validation.

BACKGROUND

A spreadsheet is a computer application that simulates a paper accounting worksheet. A spreadsheet displays multiple cells that together make up a grid consisting of rows and columns, each cell containing alphanumeric text, numeric values or formulas. A formula defines how the content of that cell is to be calculated from the contents of any other cell (or combination of cells) each time any cell is updated. Spreadsheets are frequently used for financial information because of their ability to re-calculate the entire sheet automatically after a change to a single cell is made.

These aspects of a spreadsheet allow it to be used for very advanced calculations. For example, the values of one or more cells may be determined by a complex set of formulas involving multiple dependencies on the values in other cells (which may in turn be determined by different formulas). Additionally, a spreadsheet may be used by multiple users, who are all making changes to the values and/or formulas, possibly without notifying one another.

With the increasing complexity of the calculations being performed using a spreadsheet, the likelihood of an error being made during modification of spreadsheet values or formulas increases greatly. Since the calculations are complex and the user is presented only with the end result (i.e., multiple steps in a calculation are performed without displaying intervening results) it may be difficult for the user to detect an error in the end results. The user is typically left with no way to validate the results other than manual calculation of the output values. This manual calculation may be exceedingly difficult and time consuming.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for automatic spreadsheet validation. In one embodiment, a computer spreadsheet application includes a number of designated input cells to store input data and a number of designated output cells. The output cells may calculate an output value based on a formula stored in the output cell which makes use of the input data stored in the designated input cells. In one embodiment, a validation module provides one or more validation input values from a validation scenario to the designated input cells in the computer spreadsheet application. The validation scenario may include a number of validation input values corresponding to the designated input cells in the spreadsheet. The validation input values may be pre-selected by a user of the spreadsheet program to represent possible values that may be used in the spreadsheet. The validation module identifies a calculated result from the output cell, which is calculated based on the formula associated with the output cell using the validation input values as inputs. The validation module compares the calculated result to an expected validation output value from the validation scenario. The expected validation output value is pre-calculated using the formula which should be stored in the output cell of the spreadsheet. As long as the formula in the output cell is correct, the calculated result should match the expected validation output value. If the result does not match, it is likely due to an error in the values or formula stored in the spreadsheet. In such as case, the validation module provides an error indication to the user to notify them of the error.

Figure 1:
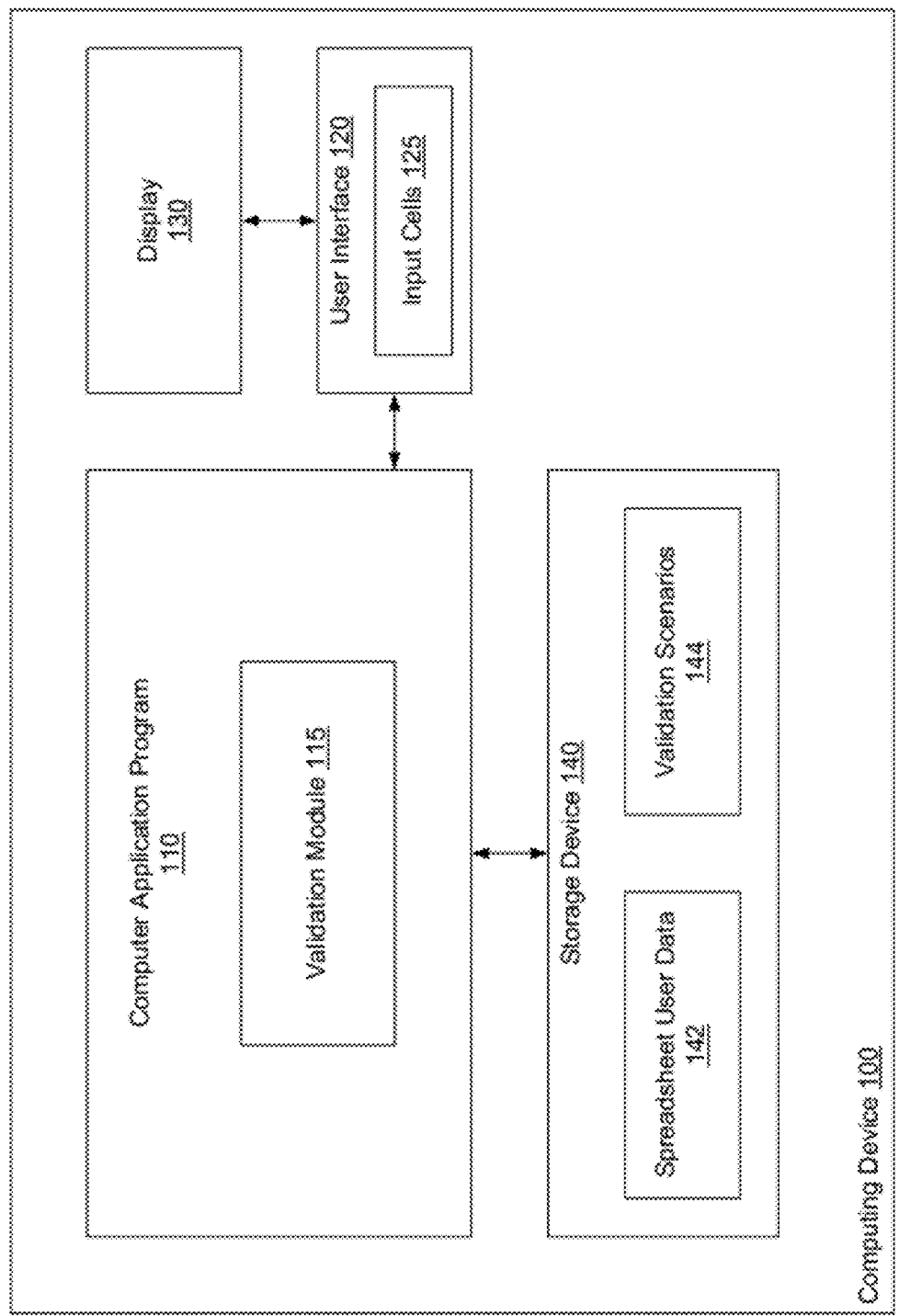
FIG. 1 is a block diagram illustrating a computing device to implement automatic spreadsheet validation, according to an embodiment.

FIG. 1 is a block diagram illustrating a computing device to implement automatic spreadsheet validation, according to an embodiment of the present invention. In one embodiment, computing device 100 includes a computer application program 110. Computer application program 110 may implement the functionality of a spreadsheet program, such as OpenOffice.org® Calc, Microsoft® Office Excel®, or other spreadsheet program. Computer application program 110 run on top of an operating system or by part of an operating system running on computing device 100. Embodiments of the automatic spreadsheet validation described herein may work with any computer application program that performs mathematical calculations on data, which may be input by a user or other computer program.

Computer application program 110 may provide a user interface 120 (e.g., a graphical user interface (GUI)) that includes one or more input cells 125, which store user data. In one embodiment, computer application program 110 may display multiple cells 125 that together make up a grid consisting of rows and columns. Each cell may contain alphanumeric text, numeric values or formulas. A formula defines how the content of that cell is to be calculated from the contents of any other cell (or combination of cells) each time any cell is updated. Computer application program 110 may perform calculations on groups of cells (such as adding or subtracting a column of cells) or create charts based on the quantities contained in a group of cells. Computer application program 110 may have a number of selectable preset functions and calculations that may be used in a cell 125, or an individual formula may be defined and stored to calculate the content of cell 125. User interface 120, including the one or more input cells 125, may be displayed on a display device 130. In one embodiment, display device 130 may be external to computing device 100.

In addition, computer application program 110 may store spreadsheet user data 142 in data storage device 140. Data storage device 140 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. Spreadsheet user data 142 may include the contents (e.g., text, numerical value, formula) for each of input cells 125. Spreadsheet user data 142 may be stored individually in memory spaces (e.g., individual files or other data structures) corresponding to each input cell 125, or may be stored together in a single memory space in the form of a file, a table or other data structure.

In one embodiment, computer application program 110 includes validation module 115. The functionality of validation module 115 may be hardcoded directly into computer application program 110 or may be available as a macro instruction ("macro"). A macro may be an instruction that automates a task or function. The macro may be associated with a macro library, stored as part of an operating system running on computing device 100, which includes the automatic spreadsheet validation functions described herein. Validation module 115 makes use of one or more validation scenarios 144 stored in storage device 140 to validate results calculated by spreadsheet formulas. The validation scenarios 144 include one or more sets of validation input variables and precalculated validation output values, such that if the validation input variables are applied to a formula in a cell of computer application program 110, the calculated result should match the validation output value. The validation scenarios 144 may be input to computing device 100 by a user through an interface provided by user interface 120. Additional details regarding validation scenarios 144 are described below with respect to FIG. 2B. Additional details regarding the operation of validation module 115 are described below with respect to FIGS. 3A and 3B.

Figures 2A, 2B:
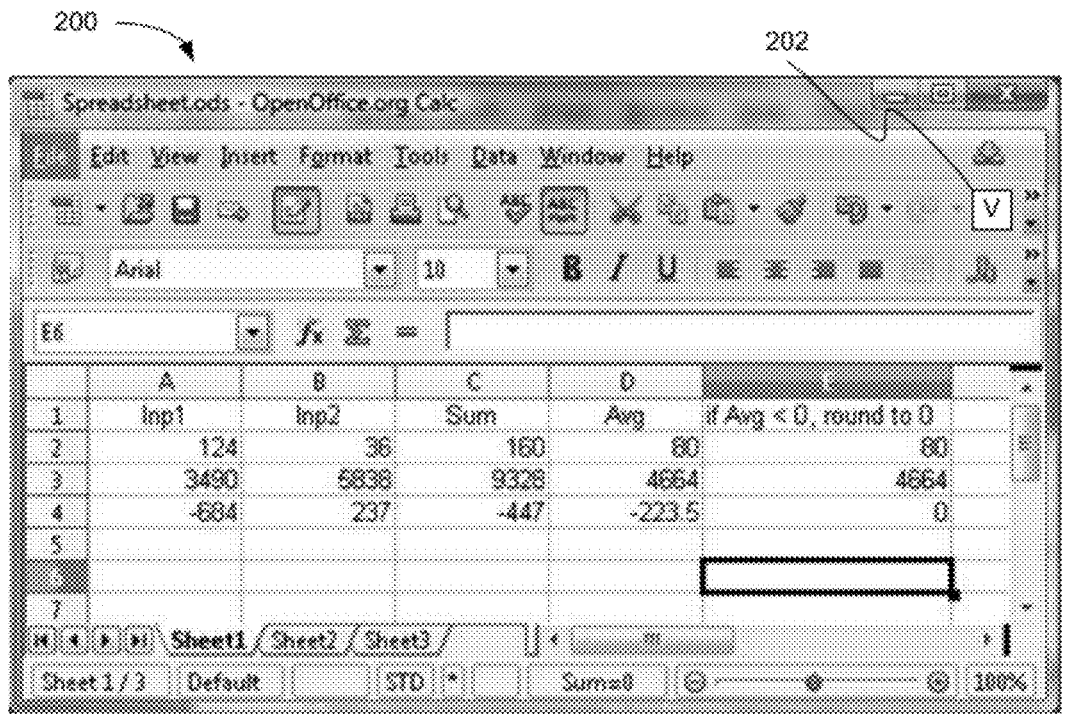
FIG. 2A illustrates a user interface of a computer application program to implement automatic spreadsheet validation, according to an embodiment.
FIG. 2B illustrates a number of validation scenarios for automatic spreadsheet validation, according to an embodiment.

FIG. 2A illustrates a user interface of a computer application program to implement automatic spreadsheet validation, according to an embodiment. The user interface, such as user interface 120 of FIG. 1, displays spreadsheet 200. Spreadsheet 200 may be created and managed by computer application program 110 of FIG. 1. Spreadsheet 200 includes an array of cells indexed by row and column. In this embodiment, horizontal rows are identified by a number (e.g., 1, 2, 3, etc.) and vertical columns are identified by a letter (e.g., A, B, C, etc.). Individual cells in spreadsheet 200 may be identified by the intersection of row and column where they are displayed. For example, distinct cells in spreadsheet 200 include cells A1, B1, C2, D4, etc.

In one embodiment, certain cells are defined as inputs and other cells are defined as outputs. In spreadsheet 200, column A is defined as a first input and thus, cell A1 includes the label ("Inp1"). Column B is defined as a second input with cell B1 including the label ("Inp2"). The user may enter input values into the cells in these columns with the values being used as inputs to calculate a result based on a formula stored elsewhere. In spreadsheet 200, column C is defined as a first output. Cell C1 includes the label ("Sum") and the rest of the cells in column C are associated with a formula to calculate the mathematical sum of the defined inputs. In this embodiment, the formula is not displayed in cell C2, but is stored in a corresponding memory location in spreadsheet user data 142 in storage device 140. Cell C2 instead displays the result of the calculation, which in this case is defined as the sum of cells A2 and B2. Similarly, cell C3 displays the result of the sum of cells A3 and B3. This mathematical formula and combination of inputs is merely one example and one of skill in the art would understand that any formula or formulas with any number of different inputs may be used.

Spreadsheet 200 may include additional outputs such as those in column D labeled "Avg" which calculate the mathematical average of the values in the same row of columns A and B. In some embodiment, certain calculations displayed in cells of spreadsheet 200 may include conditional statements. A conditional statement causes the result of the calculation to depend on a defined condition. For example, for the formula for cells in column E, if the "Avg" result calculated in column D is less than zero (i.e., a negative number), the result in column E is rounded up to zero. If the value in column D is zero or greater, the result in column E remains the same as in column D. This is merely one example of any number of possible conditional statements that may be part of a formula in spreadsheet 200. In one embodiment, upon a save operation performed by computer application program 110 for spreadsheet 200, a modification of the value or formula in any cell of spreadsheet 200, the expiration of a timer (not shown), or a manual instruction from a user of computing device 100, such as a menu option or icon selection (e.g., validate icon 202), an automatic spreadsheet validation process uses the validation scenarios 144 to verify that the formulas in spreadsheet 200 are correct.

FIG. 2B illustrates a number of validation scenarios for automatic spreadsheet validation, according to an embodiment. The validation scenarios 250 may be used to automatically validate the data in spreadsheet 200 shown in FIG. 2A. In one embodiment, the validation scenarios 250 are stored in storage device 140, as shown in FIG. 1. The validation scenarios may include one or more sets of validation inputs and one or more expected validation outputs. In this embodiment, validation scenarios 250 include six scenarios, labeled 1-6, with each scenario including inputs "Inp1" and Inp2" and outputs "Sum," "Avg" and "If Avg<0, round to 0" to match those in spreadsheet 200. The validation inputs include different values for each input in spreadsheet 200 that will produce different expected validation outputs. The expected validation outputs are pre-calculated using the same formula or formulas that should be use to calculate the outputs in spreadsheet 200, such that if the validation inputs in validation scenarios 250 were used as the inputs "Inp1" and "Inp2" in spreadsheet 200, the calculated outputs in the spreadsheet would match the expected validation output values.

In one embodiment, validation scenarios 250 are created by a user of computing device 100. The validation inputs may be randomly chosen or may be specifically chosen based on known characteristics of the formulas in spreadsheet 200, such as for example, any conditional statements. The validation inputs may be chosen so that validation scenarios 250 cover possible inputs and/or outputs for all the defined conditional situations. In this case, the validation scenarios 250 include inputs of positive numbers, negative numbers and zero, as well combinations of inputs that produce average values greater than, less than, and equal to zero. These inputs will thus sufficiently verify the outputs for both sides of the conditional statement used in the formula for column E of spreadsheet 200. In other embodiments, validation module 115 may perform an analysis of the formulas used in spreadsheet 200 and automatically select appropriate validation scenarios. In one embodiment, the formulas used in spreadsheet 200 are stored as part of spreadsheet user data 142.

Figure 3A:
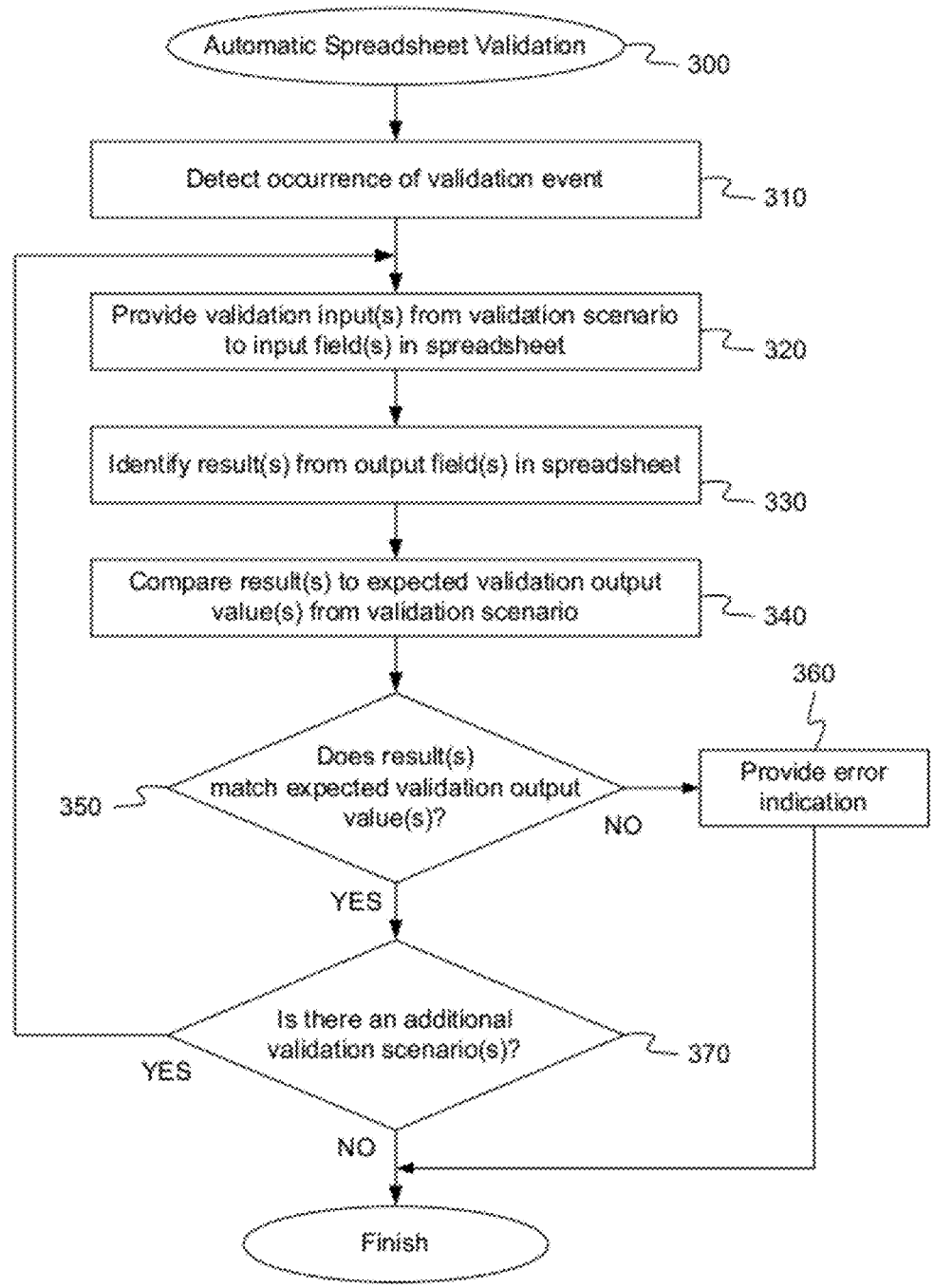
FIG. 3A is a flow diagram illustrating an automatic spreadsheet validation method, according to an embodiment.

FIG. 3A is a flow diagram illustrating an automatic spreadsheet validation method, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide an automatic spreadsheet validation method to validate results calculated by spreadsheet formulas. In one embodiment, method 300 may be performed by validation module 115, as shown in FIG. 1.

Referring to FIG. 3A, at block 310, method 300 detects the occurrence of a validation event. A validation event includes an event that causes validation module 115 to validate the data in a spreadsheet, such as spreadsheet 200. The validation event may be detected by validation event detection module 116 in validation module 115 of FIG. 3B. The validation event may include a save operation performed by computer application program 110 for spreadsheet 200, a modification of the value or formula in any cell of spreadsheet 200, the expiration of a timer, or a manual instruction from a user of computing device 100, such as a menu option or icon selection. In other embodiments, a validation event may include any other event signifying that the spreadsheet should be validated.

At block 320, method 300 provides one or more validation inputs (e.g., from a validation scenario) to the input fields in the spreadsheet. Validation module 115 may access the validation inputs stored in storage device 140 (e.g., as part of validation scenarios 144). The validation scenarios 144 may have an identifier to indicate that they are associated with a formula used to calculate the result in a particular cell or set of cells in a spreadsheet. In one embodiment, the validation scenarios 144 are created using a user interface provide by scenario creation module 117 of validation module 115 in FIG. 3B. A user may provide one or more validation input values and one or more expected validation outputs, which are stored as validation scenarios 144. In one embodiment, validation module 115 may copy the user data stored in a cell to the spreadsheet user data location 142 in storage device 140. Validation module writes the validation inputs to a space in memory corresponding to the input cells defined for the formula in the spreadsheet, however, the validation inputs may or may not be displayed to the user in user interface 120. In the example shown in FIGS. 2A and 2B, validation module 115 may provide the validation inputs from the first scenario (i.e., the values 1 and 2) to the corresponding input cells in spreadsheet 200 (i.e., cells A2 and B2). Computer application program 110 calculates a result for the formula using the validation inputs. In this example, computer application program would calculate the "Sum," "Avg" and "if Avg<0, round to 0" values in cells C2, D2 and E2 respectively.

Figure 3B:
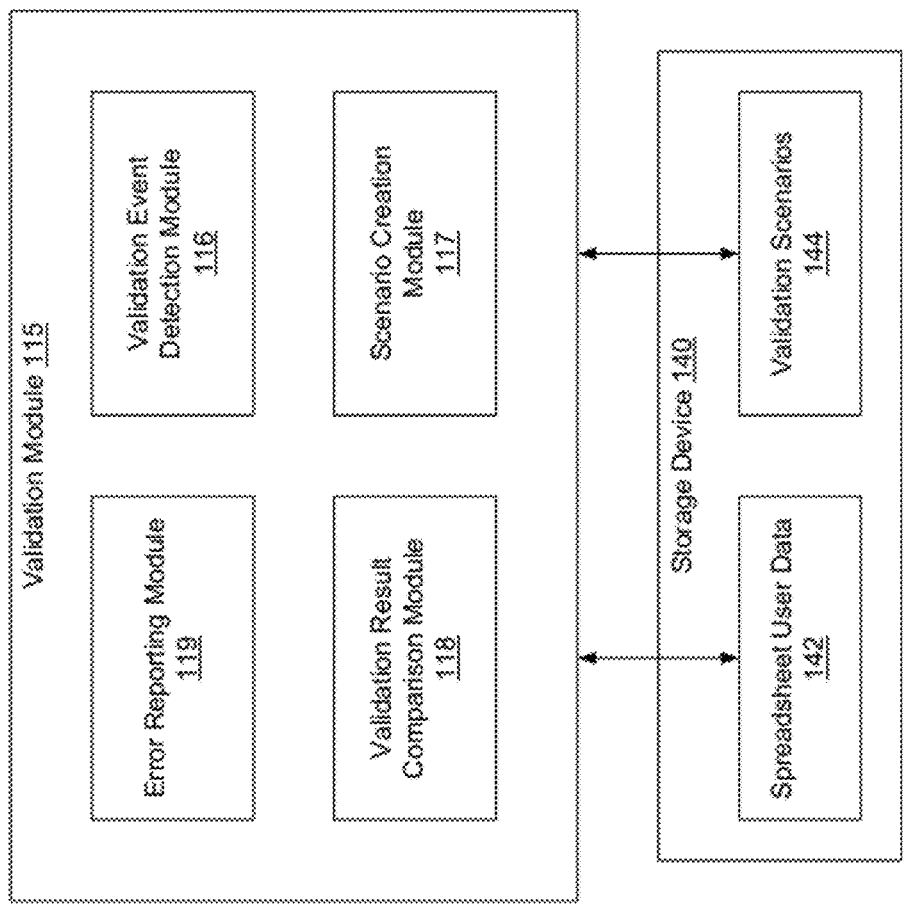
FIG. 3B is a block diagram illustrating an automatic spreadsheet validation module, according to an embodiment.

At block 330, method 300 identifies one or more results from the designated output fields in the spreadsheet. Validation module 115 may read the values in the designated cells (i.e., C2, D2, E2) and at block 340, compare the results to the expected validation output values from validation scenarios 250. In one embodiment, validation result comparison module 118 of validation module 115 in FIG. 3B compares the results to the expected validation output values. In the example above, validation result comparison module 118 may read the calculated results from cells C2, D2 and E2 and compare the values to the expected validation output values "Sum," "Avg" and "if Avg<0, round to 0" from the first validation scenario. At block 350, method 300 determines if the results match the expected validation output values. The results are considered to match the expected validation output values if they are the same numerical value.

If at block 350, method 300 determines that one or more of the calculated results do not match the corresponding expected validation output values, at block 360, method 300 provides an error indication to the user. The error indication informs the user, or other application program making use of the spreadsheet, that an error has occurred. The error may be an error in either the input values or in the formula used to calculate the outputs. Error reporting module 119 in validation module 115 of FIG. 3B, may provide the error indication in any of a number of ways, including for example, but not limited to, a pop-up notification, highlighting the cell or cells where the error occurred, an audible alarm, or other indication. This error indication allows the user to make the necessary changes to the spreadsheet in order to correct the error.

If at block 350, method 300 determines that all of the calculated results match the expected validation output values, at block 370, method 300 determines if there are any additional validation scenarios. For example, after performing the validation operation with scenario one of the validation scenarios 250, validation module 115 may determine that there are still five remaining scenarios (i.e., scenarios two through six). Method 300 returns to block 320 and performs the operations in blocks 320-370 for each of the remaining validation scenarios. Once validation module 115 determines that there are no additional validation scenarios associated with the formula being validated, method 300 ends.

Figure 4:
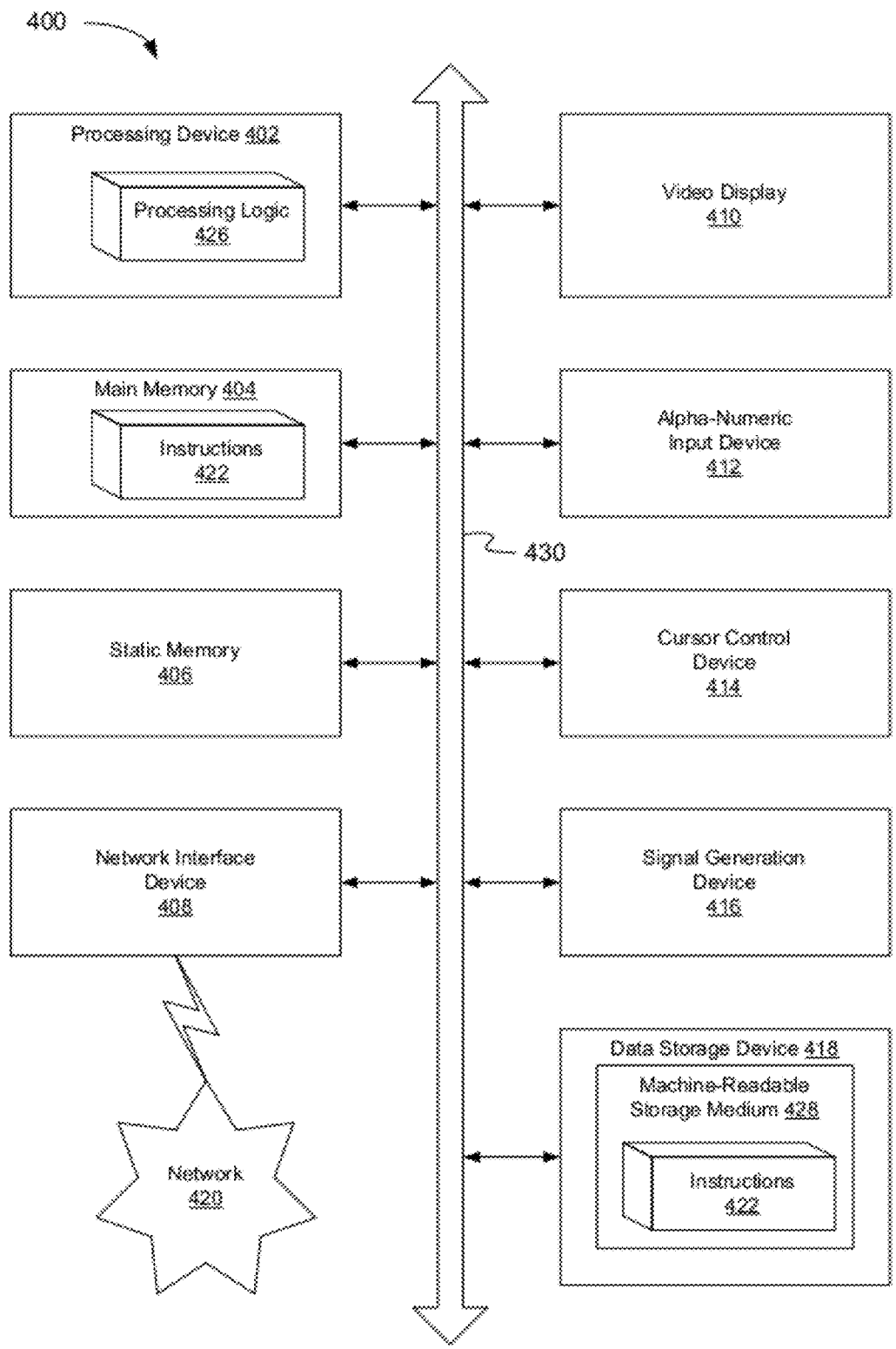
FIG. 4 is a block diagram illustrating one embodiment of a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method 300 for automatic spreadsheet validation, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
analyzing a formula included in a spreadsheet to select a validation scenario;
selecting, in view of a characteristic of the formula included in the spreadsheet, a validation input value that satisfies, for all possible outputs, the selected validation scenario in relation to a conditional statement included in the formula;
providing the validation input value to an input field of the spreadsheet, the validation input value being included in the validation scenario comprising an expected validation output value;
identifying, by a processing device, a result from an output field of the spreadsheet that is calculated in view of the conditional statement and a formula associated with the output field that uses the validation input value as an input; and
comparing the result to the expected validation output value.

2. The method of claim 1, further comprising:
providing an error indication to the spreadsheet responsive to the result not matching the expected validation output value.

3. The method of claim 1, further comprising:
determining if the result does match the expected validation output value, if there is an additional validation scenario; and
providing a validation input value from the additional validation scenario to the input field of the spreadsheet responsive to a presence of an additional validation scenario.

4. The method of claim 1, wherein the validation scenario comprises a plurality of validation inputs, wherein each of the plurality of validation inputs corresponds to an input field of the spreadsheet.

5. The method of claim 1, wherein the validation scenario comprises a plurality of expected validation output values, wherein each of the plurality of expected validation output values corresponds to an output field of the spreadsheet.

6. The method of claim 1, further comprising:
detecting an occurrence of a validation event.

7. The method of claim 6, wherein the validation event comprises at least one of saving the spreadsheet, making a change to the spreadsheet, an expiration of a timer, or receiving a validation command.

8. A system comprising:
a processing device; and
a memory operatively coupled to the processing device, the processing device to:
analyze a formula included in a spreadsheet to select a validation scenario;
select, in view of a characteristic of the formula included in the spreadsheet, a validation input value that satisfies, for all possible outputs, the selected validation scenario in relation to a conditional statement included in the formula;
provide the validation input value to an input field of the spreadsheet, the validation input value being included in the validation scenario comprising an expected validation output value;
identify a result from an output field of the spreadsheet that is calculated in view of the conditional statement and a formula associated with the output field that uses the validation input value as an input; and
compare the result to the expected validation output value.

9. The system of claim 8, wherein the processing device is further to:
provide an error indication to the spreadsheet responsive to the result not matching the expected validation output value.

10. The system of claim 8, wherein the processing device is further to:
determine, responsive to the result matching the expected validation output value, if there is an additional validation scenario; and provide a validation input value from the additional validation scenario to the input field of the spreadsheet responsive to if there is an additional validation scenario.

11. The system of claim 8, wherein the validation scenario comprises a plurality of validation inputs, wherein each of the plurality of validation inputs corresponds to an input field of the spreadsheet.

12. The system of claim 8, wherein the validation scenario comprises a plurality of expected validation output values, wherein each of the plurality of expected validation output values corresponds to an output field of the spreadsheet.

13. The system of claim 8, wherein the processing device is further to:
   detect an occurrence of a validation event.

14. The system of claim 13, wherein the validation event comprises at least one of saving the spreadsheet, making a change to the spreadsheet, an expiration of a timer, or receiving a validation command.

15. A non-transitory machine readable storage medium storing instructions which when executed by a processing device cause a processing device to:
   analyze a formula included in a spreadsheet to select a validation scenario;
   select, in view of a characteristic of the formula included in the spreadsheet, a validation input value that satisfies, for all possible outputs, the selected validation scenario in relation to a conditional statement included in the formula;
   provide the validation input value to an input field of the spreadsheet, the validation input value being included in the validation scenario comprising an expected validation output value;
   identify, by the processing device, a result from an output field of the spreadsheet that is calculated in view of the conditional statement and a formula associated with the output field that uses the validation input value as an input; and
   compare the result to the expected validation output value.

16. The storage medium of claim 15, wherein the processing device is further to:
   provide an error indication to the spreadsheet responsive to the result not matching the expected validation output value.

17. The storage medium of claim 15, wherein the processing device is further to:
   determine, responsive to the result matching the expected validation output value, if there is an additional validation scenario; and
   provide a validation input value from the additional validation scenario to the input field of the spreadsheet responsive to a presence of an additional validation scenario.

18. The storage medium of claim 15, wherein the validation scenario comprises a plurality of validation inputs, wherein each of the plurality of validation inputs corresponds to an input field of the spreadsheet.

19. The storage medium of claim 15, wherein the validation scenario comprises a plurality of expected validation output values, wherein each of the plurality of expected validation output values corresponds to an output field of the spreadsheet.

20. The storage medium of claim 15, wherein the processing devices is further to detect an occurrence of a validation event.

* * * * *